United States Patent
Takano et al.

(10) Patent No.: US 10,678,000 B2
(45) Date of Patent: Jun. 9, 2020

(54) PULL ROD AND ALIGNMENT KEY FOR A FIBER OPTIC CONNECTOR AND ADAPTER

(71) Applicant: Senko Advanced Components, Inc., Marlborough, MA (US)

(72) Inventors: Kazuyoshi Takano, Tokyo (JP); Jeffrey Gniadek, Oxford, ME (US)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 16/240,450

(22) Filed: Jan. 4, 2019

(65) Prior Publication Data
US 2019/0235178 A1 Aug. 1, 2019

Related U.S. Application Data

(60) Provisional application No. 62/614,189, filed on Jan. 5, 2018.

(51) Int. Cl.
*G02B 6/38* (2006.01)

(52) U.S. Cl.
CPC ......... *G02B 6/3893* (2013.01); *G02B 6/3821* (2013.01); *G02B 6/3825* (2013.01); *G02B 6/3831* (2013.01); *G02B 6/3834* (2013.01); *G02B 6/3851* (2013.01); *G02B 6/3882* (2013.01)

(58) Field of Classification Search
None
See application file for complete search history.

(56) References Cited

U.S. PATENT DOCUMENTS

| | | |
|---|---|---|
| 4,762,388 A | 8/1988 | Tanaka et al. |
| 4,764,129 A | 8/1988 | Jones et al. |
| 4,840,451 A | 6/1989 | Sampson et al. |
| D323,143 S | 1/1992 | Ohkura et al. |

(Continued)

FOREIGN PATENT DOCUMENTS

| | | |
|---|---|---|
| CN | 2836038 | 11/2006 |
| CN | 201383588 | 1/2010 |

(Continued)

OTHER PUBLICATIONS

International Search Report and Written Opinion for Application No. PCT/US11/58799, dated Apr. 27, 2012, pp. 5.

(Continued)

*Primary Examiner* — Jerry Rahll
(74) *Attorney, Agent, or Firm* — Edward S. Jarmolowicz, Esq.

(57) ABSTRACT

An optical connector holding one or more LC-type optical ferrules is provided. The optical connector includes an outer housing, pin keep, and two pins. One pin acts as a push/pull mechanism to release the connector from the adapter. The pin keep has two side clips with one of two side clips having an alignment key on a top surface. The alignment key engages a corresponding surface in the adapter housing to aid in polarity setting of the connector with the adapter. The adapter has a panel mounting clip that contains one or more latches that engage and retain the connector in the adapter housing. The panel clips and surfaces of the connector are constructed to reduce the overall size of the connector and adapter. The adapter has a plural of internal ribs forming one or more channels.

2 Claims, 12 Drawing Sheets

(56) References Cited

U.S. PATENT DOCUMENTS

| | | |
|---|---|---|
| 5,212,752 A | 5/1993 | Stephenson et al. |
| 5,317,663 A | 5/1994 | Beard et al. |
| 5,348,487 A | 9/1994 | Marazzi et al. |
| 5,444,806 A | 8/1995 | deMarchi et al. |
| 5,481,634 A | 1/1996 | Anderson et al. |
| 5,506,922 A | 4/1996 | Grois et al. |
| 5,570,445 A | 10/1996 | Chou et al. |
| 5,588,079 A | 12/1996 | Tanabe et al. |
| 5,684,903 A | 11/1997 | Kyornasu et al. |
| 5,687,268 A | 11/1997 | Stephenson et al. |
| 5,937,130 A | 8/1999 | Amberg et al. |
| 5,956,444 A | 9/1999 | Duda et al. |
| 5,971,626 A | 10/1999 | Knodell et al. |
| 6,041,155 A | 3/2000 | Anderson et al. |
| RE37,080 E | 3/2001 | Stephenson et al. |
| 6,206,577 B1 | 3/2001 | Hall, III et al. |
| 6,206,581 B1 | 3/2001 | Driscoll et al. |
| 6,227,717 B1 | 5/2001 | Ott et al. |
| 6,247,849 B1 | 6/2001 | Liu |
| 6,461,054 B1 | 10/2002 | Iwase |
| 6,478,472 B1 * | 11/2002 | Anderson ............ G02B 6/3825 385/53 |
| 6,551,117 B2 | 4/2003 | Poplawski et al. |
| 6,579,014 B2 | 6/2003 | Melton et al. |
| 6,648,520 B2 | 11/2003 | McDonald et al. |
| 6,854,894 B1 | 2/2005 | Yunker et al. |
| 7,090,406 B2 | 8/2006 | Melton et al. |
| 7,090,407 B2 | 8/2006 | Melton et al. |
| 7,091,421 B2 | 8/2006 | Kukita et al. |
| 7,111,990 B2 | 9/2006 | Melton et al. |
| 7,113,679 B2 | 9/2006 | Melton et al. |
| D533,504 S | 12/2006 | Lee |
| 7,150,567 B1 | 12/2006 | Luther et al. |
| 7,153,041 B2 | 12/2006 | Mine et al. |
| 7,198,409 B2 | 4/2007 | Smith et al. |
| 7,207,724 B2 | 4/2007 | Gurreri |
| D543,124 S | 5/2007 | Raatikainen |
| D543,146 S | 5/2007 | Chen et al. |
| 7,258,493 B2 | 8/2007 | Milette |
| 7,281,859 B2 | 10/2007 | Mudd et al. |
| D558,675 S | 1/2008 | Chien et al. |
| 7,315,662 B2 | 1/2008 | En Lin et al. |
| 7,325,976 B2 | 2/2008 | Gurreri et al. |
| 7,325,980 B2 | 2/2008 | Pepe |
| 7,329,137 B2 | 2/2008 | Martin et al. |
| 7,354,291 B2 | 4/2008 | Caveney et al. |
| 7,387,447 B2 | 6/2008 | Mudd et al. |
| 7,390,203 B2 | 6/2008 | Murano et al. |
| D572,661 S | 7/2008 | En Lin et al. |
| 7,431,604 B2 | 10/2008 | Waters et al. |
| 7,463,803 B2 | 12/2008 | Cody et al. |
| 7,465,180 B2 | 12/2008 | Kusuda et al. |
| 7,561,775 B2 | 7/2009 | Lin et al. |
| 7,591,595 B2 | 9/2009 | Lu et al. |
| 7,594,766 B1 | 9/2009 | Sasser et al. |
| 7,641,398 B2 | 1/2010 | O'Riorden et al. |
| 7,695,199 B2 | 4/2010 | Teo |
| 7,699,533 B2 | 4/2010 | Milette |
| 7,824,113 B2 | 11/2010 | Wong et al. |
| D641,708 S | 7/2011 | Yamauchi |
| 8,251,733 B2 | 8/2012 | Wu |
| 9,448,370 B2 | 9/2016 | Xue et al. |
| 9,595,786 B1 * | 3/2017 | Takano ............... G02B 6/3825 |
| 10,067,301 B2 | 9/2018 | Murray et al. |
| 2002/0118926 A1 * | 8/2002 | Shimoji ............... G02B 6/3821 385/76 |
| 2003/0063862 A1 * | 4/2003 | Fillion ................ G02B 6/3825 385/53 |
| 2004/0052473 A1 | 3/2004 | Seo et al. |
| 2004/0136657 A1 | 7/2004 | Ngo |
| 2004/0141693 A1 | 7/2004 | Szilagyi et al. |
| 2004/0161958 A1 | 8/2004 | Togami et al. |
| 2006/0089049 A1 | 4/2006 | Sedor |
| 2006/0269194 A1 | 11/2006 | Luther et al. |
| 2007/0149062 A1 | 6/2007 | Long et al. |
| 2007/0230874 A1 | 10/2007 | Lin |
| 2007/0232115 A1 | 10/2007 | Burke et al. |
| 2007/0243749 A1 | 10/2007 | Wu |
| 2008/0044137 A1 | 2/2008 | Luther et al. |
| 2008/0069501 A1 | 3/2008 | Mudd et al. |
| 2008/0101757 A1 | 5/2008 | Lin et al. |
| 2008/0226237 A1 | 9/2008 | O'Riorden |
| 2008/0267566 A1 | 10/2008 | Lin et al. |
| 2009/0028507 A1 | 1/2009 | Jones et al. |
| 2009/0214162 A1 | 8/2009 | O'Riorden |
| 2009/0220197 A1 | 9/2009 | Gniadek et al. |
| 2010/0034502 A1 | 2/2010 | Lu et al. |
| 2010/0322561 A1 | 12/2010 | Lin et al. |
| 2011/0044588 A1 | 2/2011 | Larson et al. |
| 2011/0131801 A1 | 6/2011 | Nelson et al. |
| 2011/0177710 A1 | 7/2011 | Tobey |
| 2017/0205591 A1 * | 7/2017 | Takano ............... G02B 6/3885 |

FOREIGN PATENT DOCUMENTS

| | | |
|---|---|---|
| DE | 202006011910 U1 | 3/2007 |
| DE | 102006019335 A1 | 10/2007 |
| EP | 1074868 A1 | 7/2001 |
| EP | 1566674 A1 | 8/2005 |
| JP | 2009229545 | 10/2009 |
| JP | 2009276493 A | 11/2009 |
| WO | 200179904 A2 | 10/2001 |
| WO | 2008112986 A1 | 9/2008 |
| WO | 2009135787 A1 | 11/2009 |

OTHER PUBLICATIONS

Fiber Optic Connectors and Assemblies Catalog, 2009, Huber & Suhner Fiber Optics, Herisau, Switzerland, http://www.google.co.in/uri?sa=t&source=web&cd=63&ved=0CCMQFjACODw&url=http%3A%2F%2Fwww.hubersuhner.com%2Fwrite_rtn_binary.pdf%3Fbinaryid%3D8DBC7DE2EB72D315%26binarytype%3D48403DAA363AEB7E&ei=ZvcvTujWH4ntrAfH-dXZCg&usg=AFQjCNEINAdC-4avewRJU6lDVetiWYbr0QQ.

Fiber Optic Interconnect Solutions, Tactical Fiber Optic Connector Cables and Termini, 2006, Glenair, Inc., Glendale, California.

Fiber Optic Products Catalog, Nov. 2007, Tyco Electronics Corporation, Harrisburg, Pennsylvania.

International Search Report and Written Opinion for Application No. PCT/US12/039126, dated Aug. 27, 2012, pp. 6.

* cited by examiner

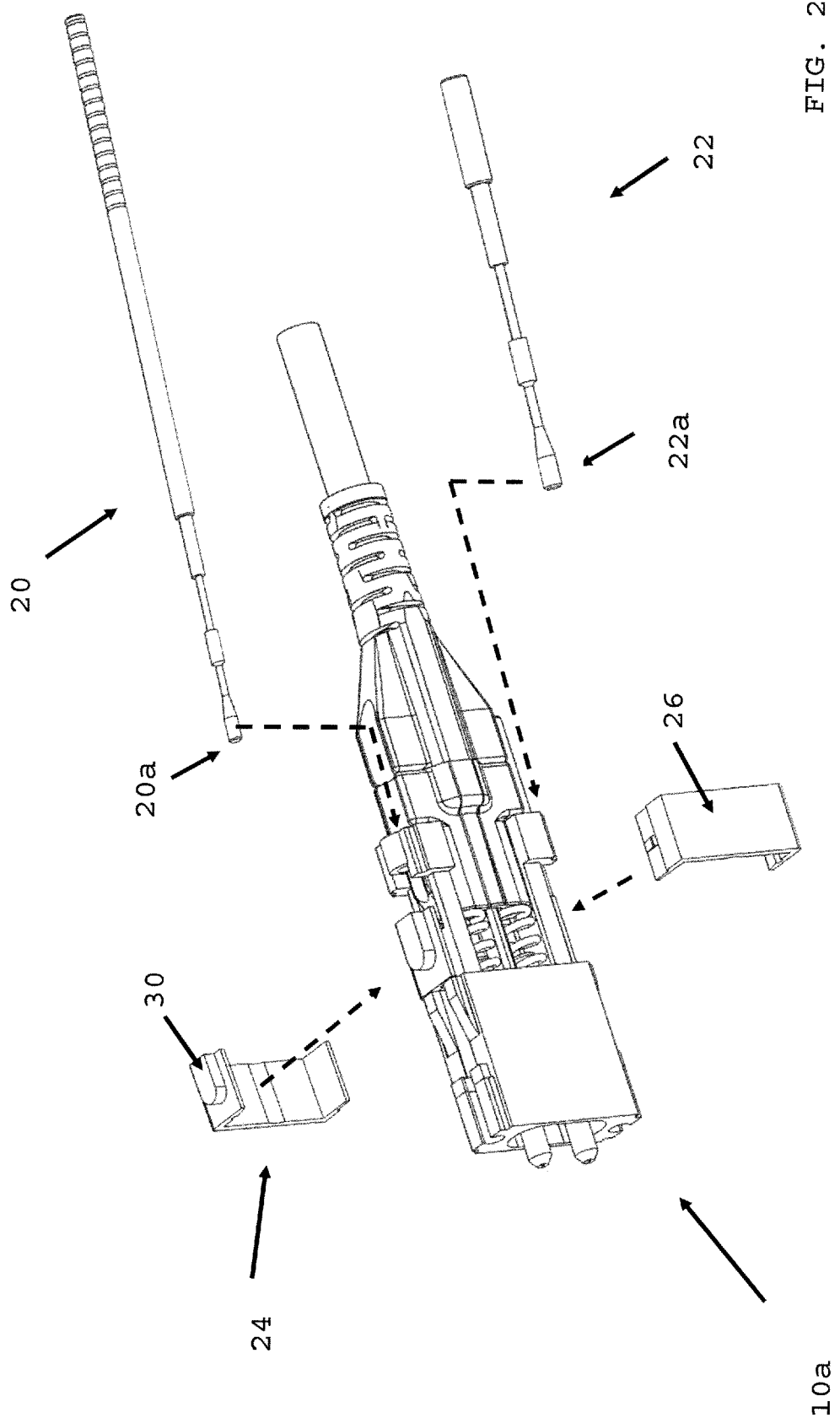

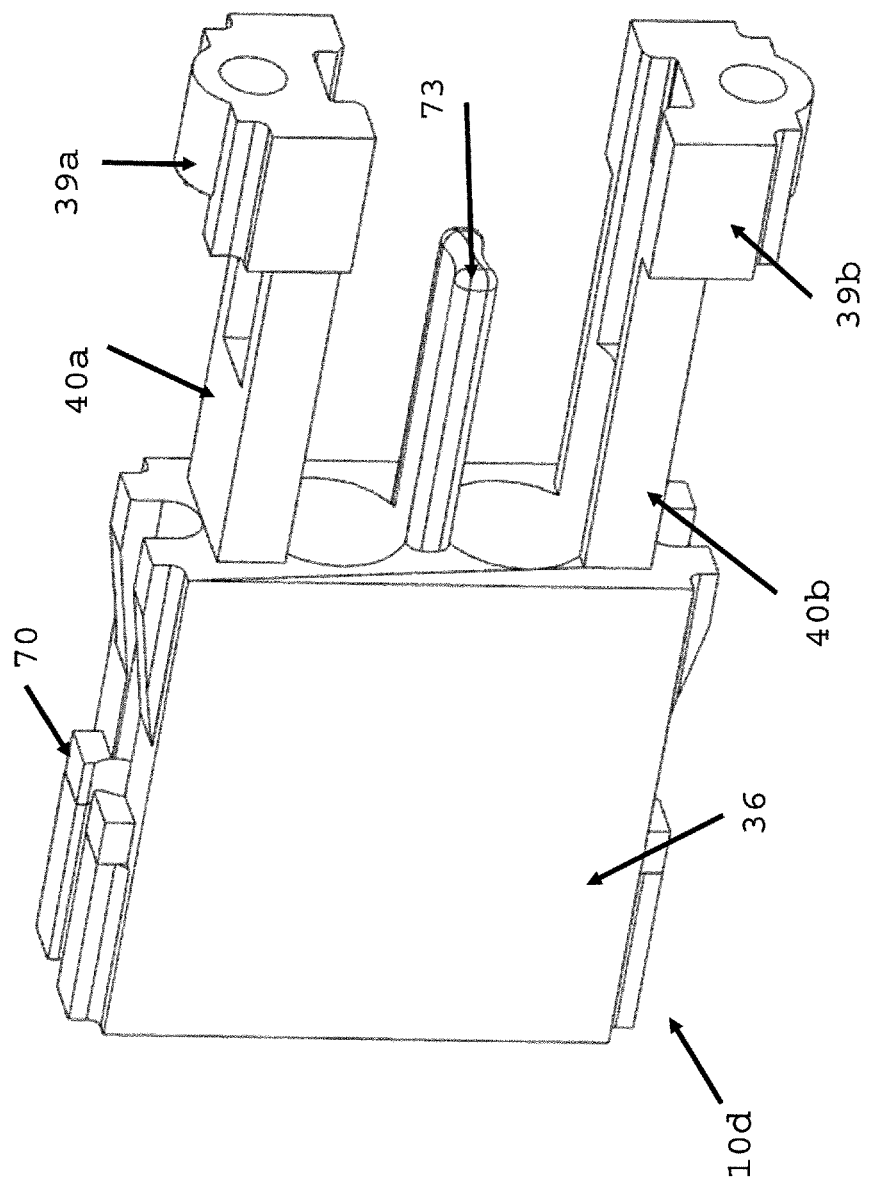
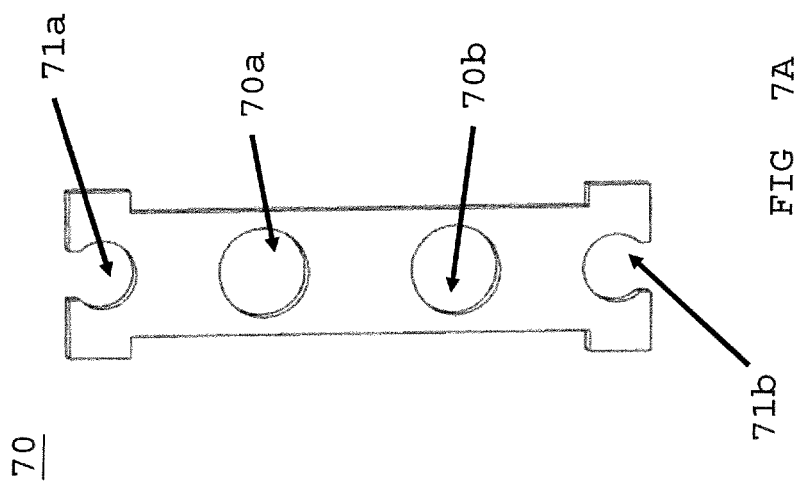
FIG. 7B
FIG 7A

US 10,678,000 B2

PULL ROD AND ALIGNMENT KEY FOR A FIBER OPTIC CONNECTOR AND ADAPTER

RELATED APPLICATION

This application claims priority to U.S. provisional patent application 62/614,189 filed Jan. 5, 2018, titled "Pull Rod and Alignment Key Connector".

FIELD OF THE INVENTION

The present invention relates to optical fiber connectors and adapters, and more particularly, to push/pull mechanisms to release a connector from an adapter and a polarity changing mechanism to align the connector polarity with the adapter polarity for proper signal transmission.

BACKGROUND

The prevalence of the Internet has led to unprecedented growth in communication networks. Consumer demand for service and increased competition has caused network providers to continuously find ways to improve quality of service while reducing cost.

Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead. However, room for improvement in the area of data centers, specifically as it relates to fiber optic connects, still exists. For example, manufacturers of connectors and adapters are always looking to reduce the size of the devices, while increasing ease of deployment, robustness, and modifiability after deployment. In particular, more optical connectors may be needed to be accommodated in the same footprint previously used for a smaller number of connectors in order to provide backward compatibility with existing data center equipment. For example, one current footprint is known as the small form-factor pluggable transceiver footprint (SFP). This footprint currently accommodates two LC-type ferrule optical connections. However, it may be desirable to accommodate four optical connections (two duplex connections of transmit/receive) within the same footprint. Another current footprint is the quad small form-factor pluggable (QSFP) transceiver footprint. This footprint currently accommodates four LC-type ferrule optical connections. However, it may be desirable to accommodate eight optical connections of LC-type ferrules (four duplex connections of transmit/receive) within the same footprint.

In communication networks, such as data centers and switching networks, numerous interconnections between mating connectors may be compacted into high-density panels. Panel and connector producers may optimize for such high densities by shrinking the connector size and/or the spacing between adjacent connectors on the panel. While both approaches may be effective to increase the panel connector density, shrinking the connector size and/or spacing may also increase the support cost and diminish the quality of service.

In a high-density panel configuration, adjacent connectors and cable assemblies may obstruct access to the individual release mechanisms. Such physical obstructions may impede the ability of an operator to minimize the stresses applied to the cables and the connectors. For example, these stresses may be applied when the user reaches into a dense group of connectors and pushes aside surrounding optical fibers and connectors to access an individual connector release mechanism with his/her thumb and forefinger. Over-stressing the cables and connectors may produce latent defects, compromise the integrity and/or reliability of the terminations, and potentially cause serious disruptions to network performance.

While an operator may attempt to use a tool, such as a screwdriver, to reach into a dense group of connectors and activate a release mechanism, adjacent cables and connectors may obstruct the operator's line of sight, making it difficult to guide the tool to the release mechanism without pushing aside the adjacent cables. Moreover, even when the operator has a clear line of sight, guiding the tool to the release mechanism may be a time-consuming process. Thus, using a tool may not be effective at reducing support time and increasing the quality of service.

BRIEF DESCRIPTION OF THE DRAWINGS

FIG. 2 is an exploded view of the connector of FIG. 1;
FIG. 7A is a perspective views of a pin guide insert;
FIG. 7B is a perspective view of the connector body of FIG. 1.

DETAILED DESCRIPTION

Figure 1:
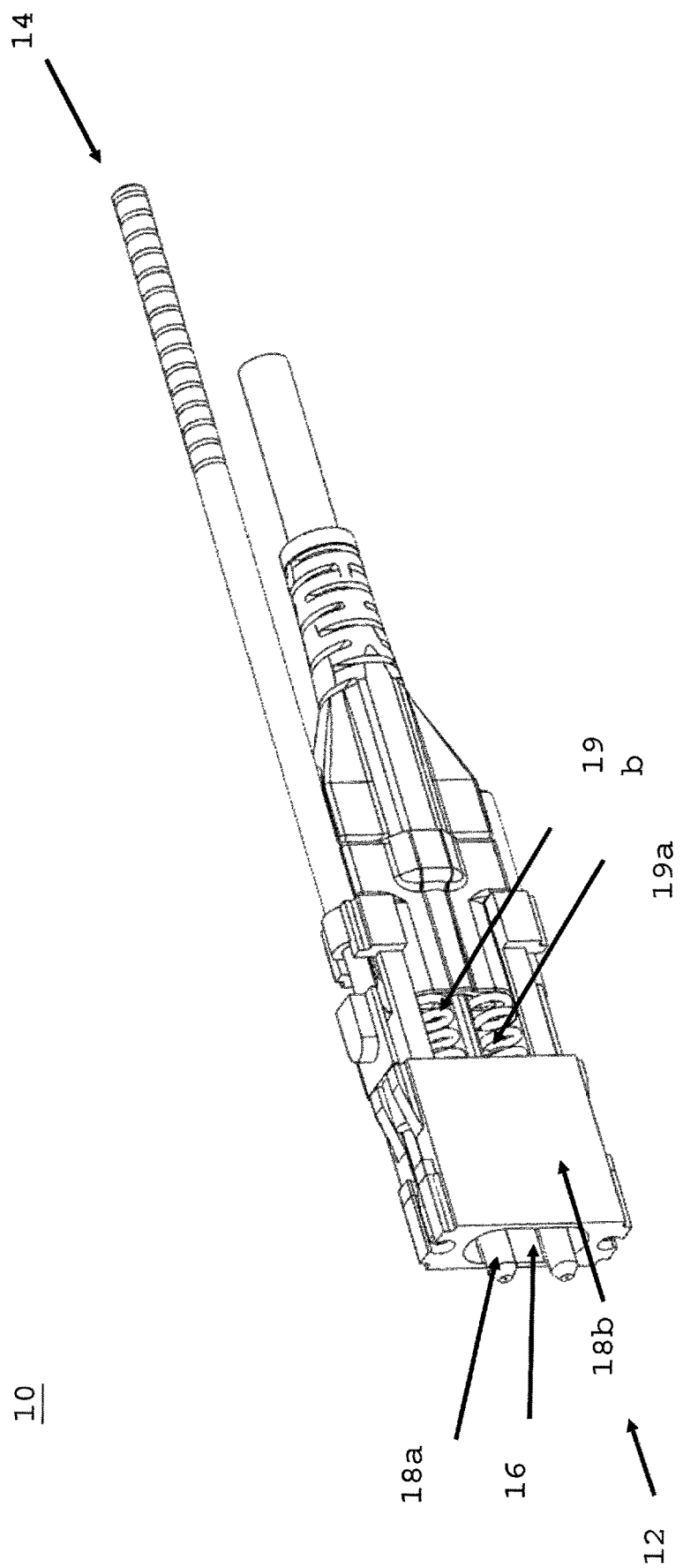
FIG. 1 is a perspective view of the connector.

A connector, as used herein, refers to a device and/or components thereof that connects a first module or cable to a second module or cable. The connector may be configured for fiber optic transmission or electrical signal transmission. The connector may be any suitable type now known or later developed, for example, embodiments of multiple-fiber push-on/pull-off (MPO) connector 10 as shown in FIG. 1. FIG. 1 depicts a connector (10) as proximal end (12) and a distal end (14). The proximal end (10) is inserted into an adapter (not shown), and the distal end (14) is in electrical communication with a signal that contains data or information. The connector opening (16) exposes two ferrules (18a, 18b) used for transmit and receive of the signal. The ferrule springs (19a, 19b) hold the ferrules as known in the prior art.

Figure 2A:
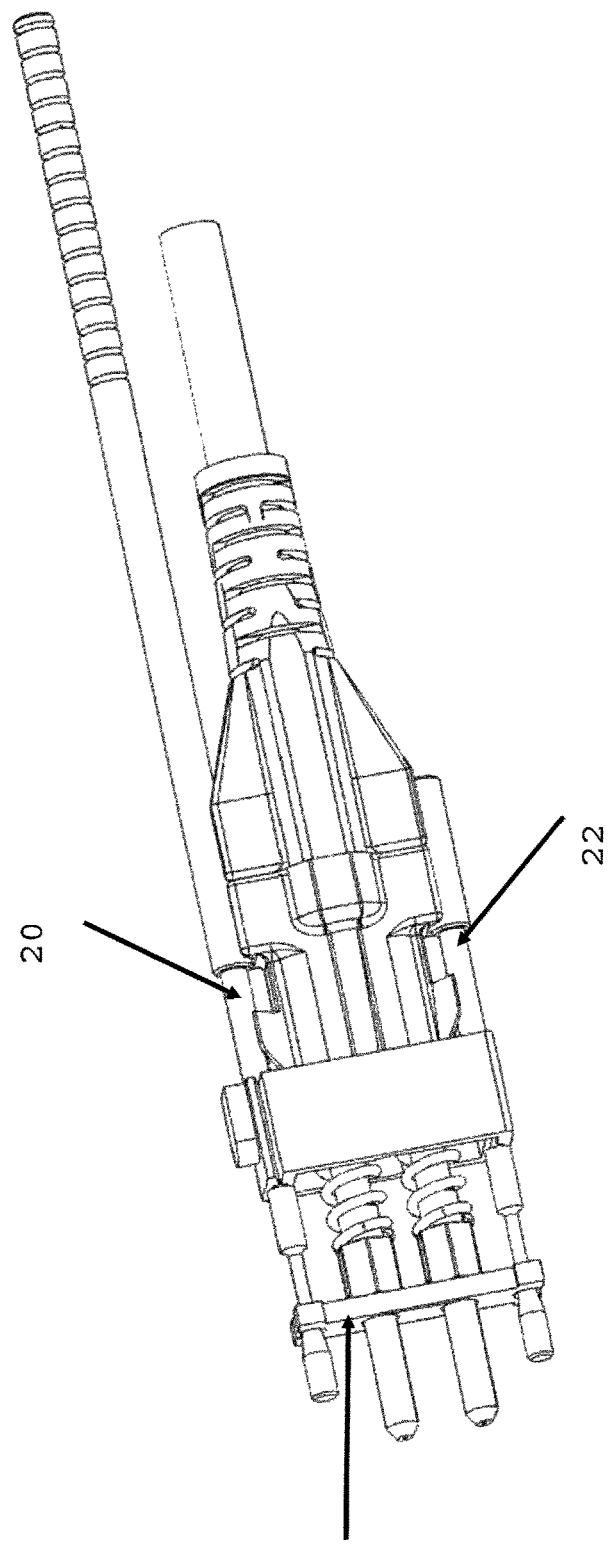
FIG. 2A is a cut-away of FIG. 1 connector with outer housing removed showing pins secured therein.

FIG. 2 shows an exploded view of the connector of FIG. 1 according to an embodiment of the present invention. Referring to FIG. 2, connector assembly (10a) shows a long pin (20) that when retracted releases the connector (10) from the adapter (not shown). An alignment key (30) (also refer to FIG. 3), on side clip (24) guides connector (10) into an adapter (not shown). Side clips (24, 26) also form an outer housing or pin keeper (32) for the long (20) and short (22)

pins. In operation, the long pin is retracted and the short pin moves contemporaneously with long pin. A taper (20a) on the long pin (20) and a taper (22a) on the short pin (22) engage an adapter latch (not shown) on an adapter mounting clip (not shown), which releases the connector (10) of FIG. 1, from the adapter (not shown). The tapers, adapter and mounting clips are shown in FIG. 2. FIG. 2A depicts connector (10) without outer housing and illustrates pins (20,22) inserted into connector and secured by pin retainer bracket (70), refer to FIG. 7A.

Figure 3:
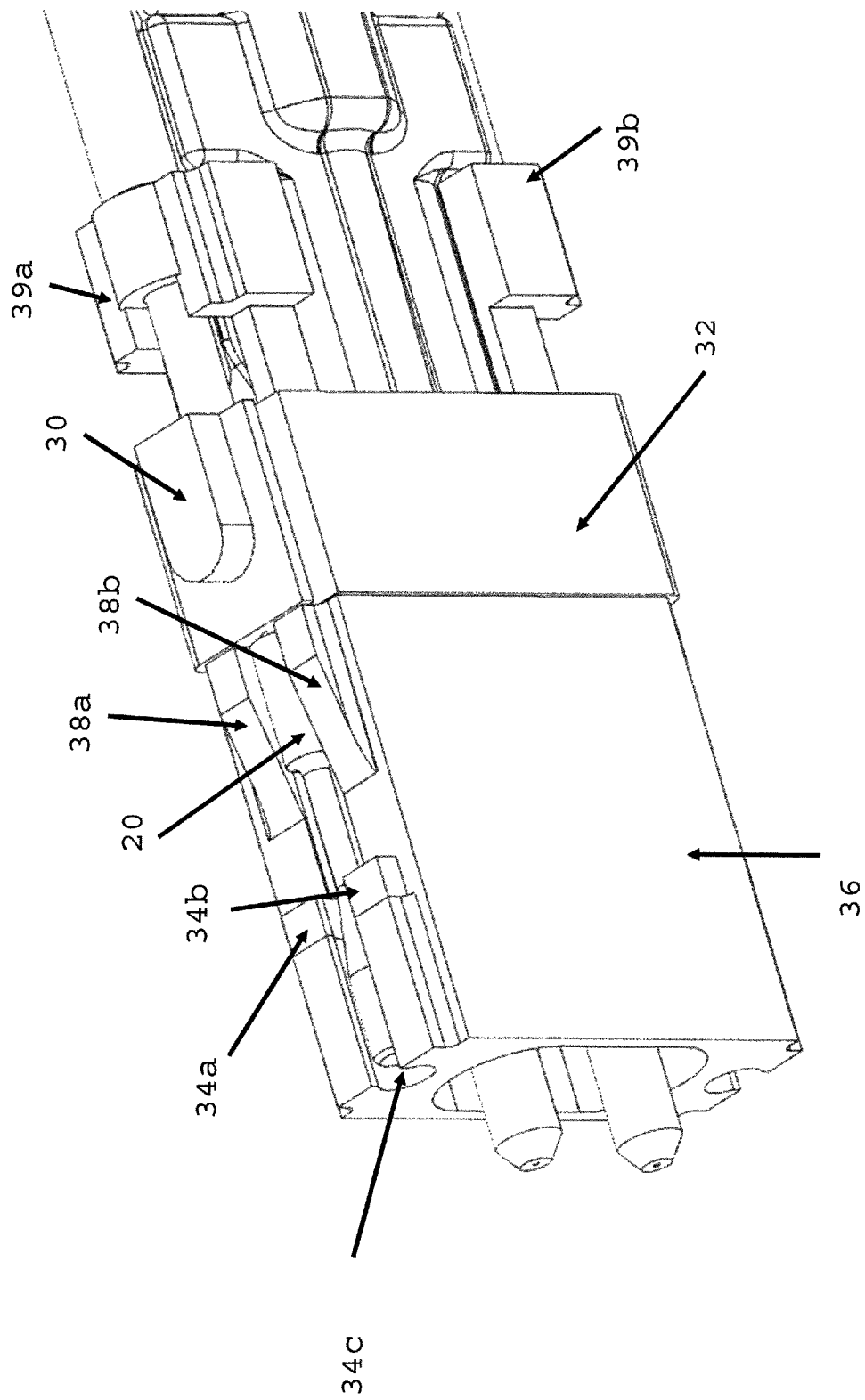
FIG. 3 is a perspective view of connector housing and pin keep assembly.

FIG. 3 shows the connector (10) housing with the pin keeper (32) formed by the side clips (24, 26). On a top surface of the pin keeper (32) is an alignment key (30) at the distal end (14) of the connector (10). Nearer the proximal end (12) is a pair of adapter hook latch surfaces (34a, 34b). The surfaces (34a, 34b) form a channel (34c) that accepts the proximal end of the long pin (20). The distal end of the surfaces (34a, 34b) further comprises a metal face or similar reinforced surface such as a hard plastic. The reinforced face is needed to protect against wear from the metal adapter hooks (not shown) that are part of the adapter mounting plate (not shown). Connector (10) has an upper pin guide (39a) and a lower pin guide (39b) in which the pins (20,22) slide from front to back, and back during operation.

Referring to FIG. 3, alignment key (30), upper housing (36) and pin keeper (32) form the connector housing (31). The alignment key (30) is molded into either side clip (24, 26). In operation, the alignment key (30) is on a top side of the connector housing (31) which indicates a first polarity, or is on a bottom side of the connector housing (31) which indicates a second polarity. The first and second polarity are different. Upon insertion of the connector (10) into the adapter, alignment key (30) engages with a cutout (not shown) that corresponds to the outer dimensions of alignment key (30). The final orientation ensures the connector (10) signal can be transmitted to the corresponding connector inserted on the opposite side of an adapter housing (50). An adapter latch (64a-64d) (refer to FIG. 6) engages adapter latching surface (38a) to secure connector (10) within a channel of a first adapter opening (50a.1) or a second adapter opening (50a.2). A channel is indicated using an alignment key cut-out (50b.1-50b.4 (refer to FIG. 5) 80b.1-80b.4; 81b.1-81b.4 (refer to FIG. 8A)) on a side of adapter housing at either opening. The connector (10) is secured via latch (66a) when the connector (10) is inserted into the adapter (50).

Figure 4:
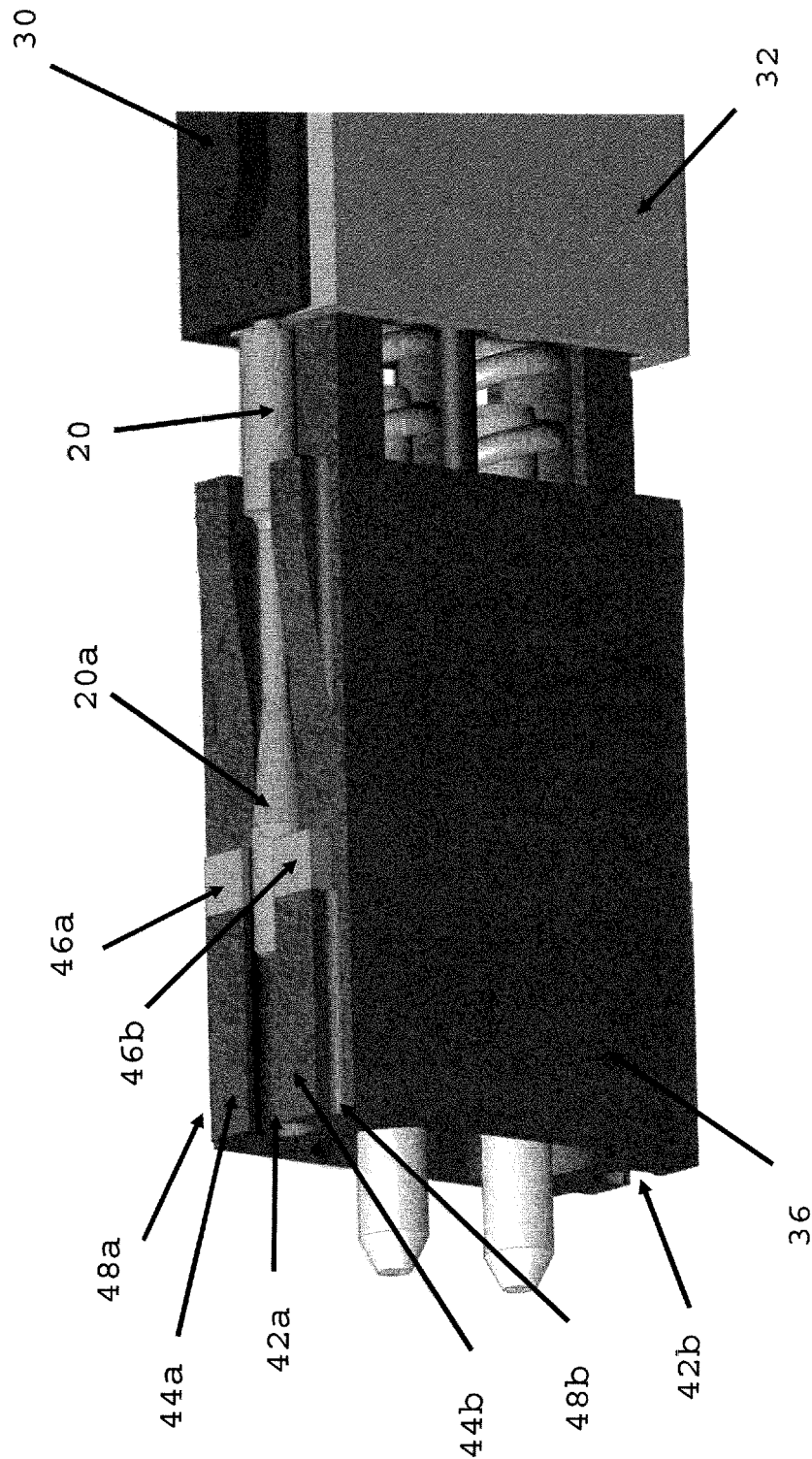
FIG. 4 is a perspective view of the pin keep assembly retracted from the connector housing.

FIG. 4 a perspective view of connector housing (36) with pin keeper (32) housing retracted exposing springs. As the long pin (20) is retracted the pin keeper housing (36) moves distally and the tapered sections of the long (20a) and short pin (not shown) cause the adapter latch (62) to be lifted thereby releasing the connector from the adapter housing (50). The outer portion of the connector housing (36) has a metal plate (46a, 46b) insert-molded on the top side of a wall (44a, 44b) that form channels (42a, 42b) that accept pins front portion (20a, 22a (refer to FIG. 2). The metal plate increases latching strength of a connector (10) within the adapter (50). This also eliminates wear from the adapter metal latching hooks (64a-64d; 65a-65d) (refer to FIG. 6). Each wall (44a, 44b) has outer notched corners (48a, 48b) that engage internal ribs (92a, 92b, 92c, 92d, 92e) (refer to FIG. 9A) positioned on inside wall of adapter (50). This improves side load restraint for individual connectors (10) being inserted into the adapter (50) channel (50b.1-50b.4). The internal ribs (92a, 92b) (refer to FIG. 9A) side by side form a channel (90b.1-90b.4).

Figure 5:
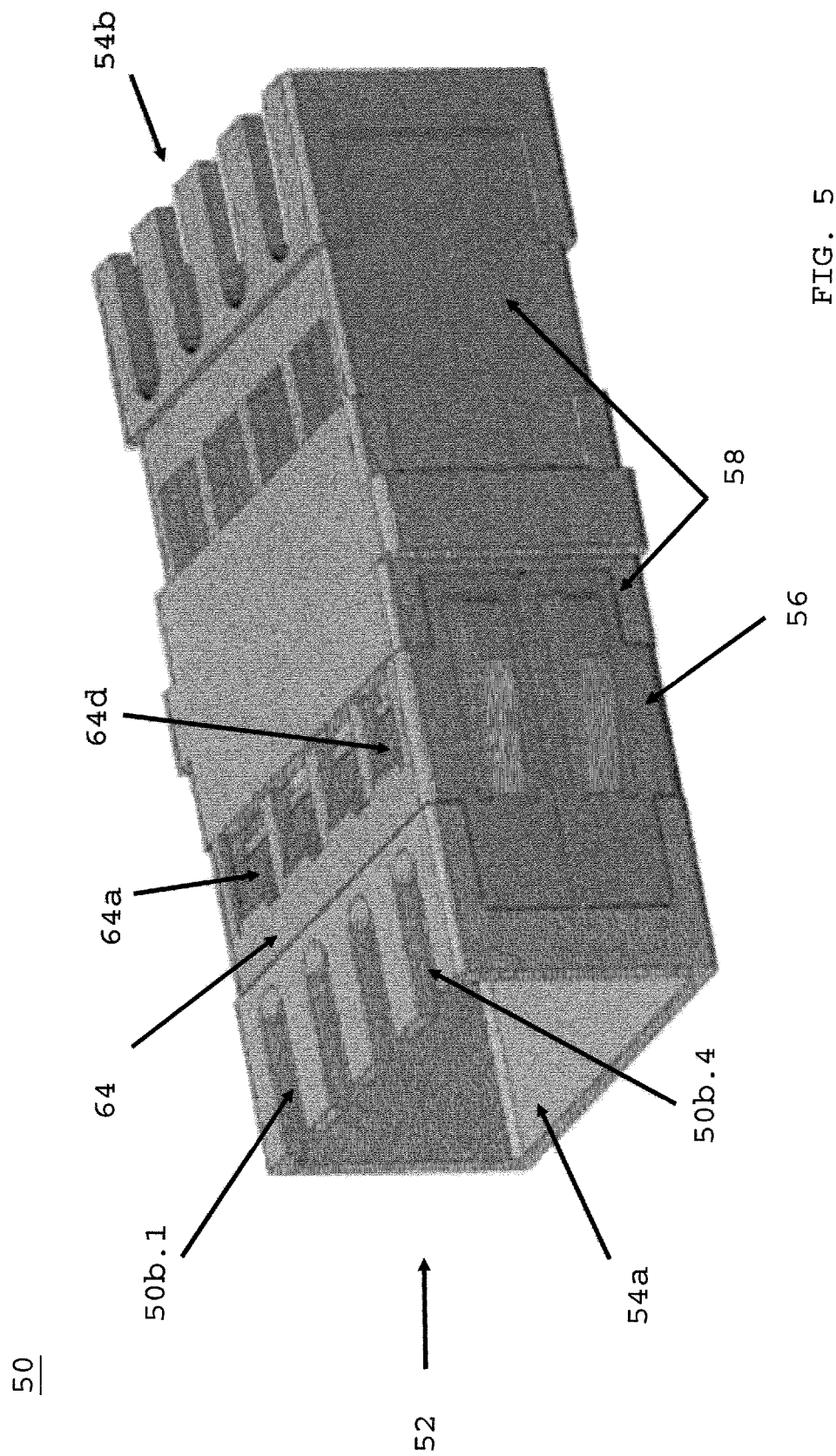
FIG. 5 is a perspective view of an adapter with panel mounting clip installed.

FIG. 5 is a perspective view of an adapter (50). The adapter (50) has a panel mounting clip (56) attached to the adapter outer housing at the proximal end of the adapter (52). The distal end or opposite end has a recess (58) for accepting a clip (56). A connector is inserted into the adapter through the receptacle (54), in this case first opening (54a) or second opening (54b) can accept a quad connector (10) or up to four connectors (10). Connector (10) upon full insertion engages an adapter latch (64) hooks (64a-64b) respectively for each inserted connector (10). Alignment key slots (50b.1-50b.4) indicate channels within opening (54a) or opposing opening (54b).

Figure 6:
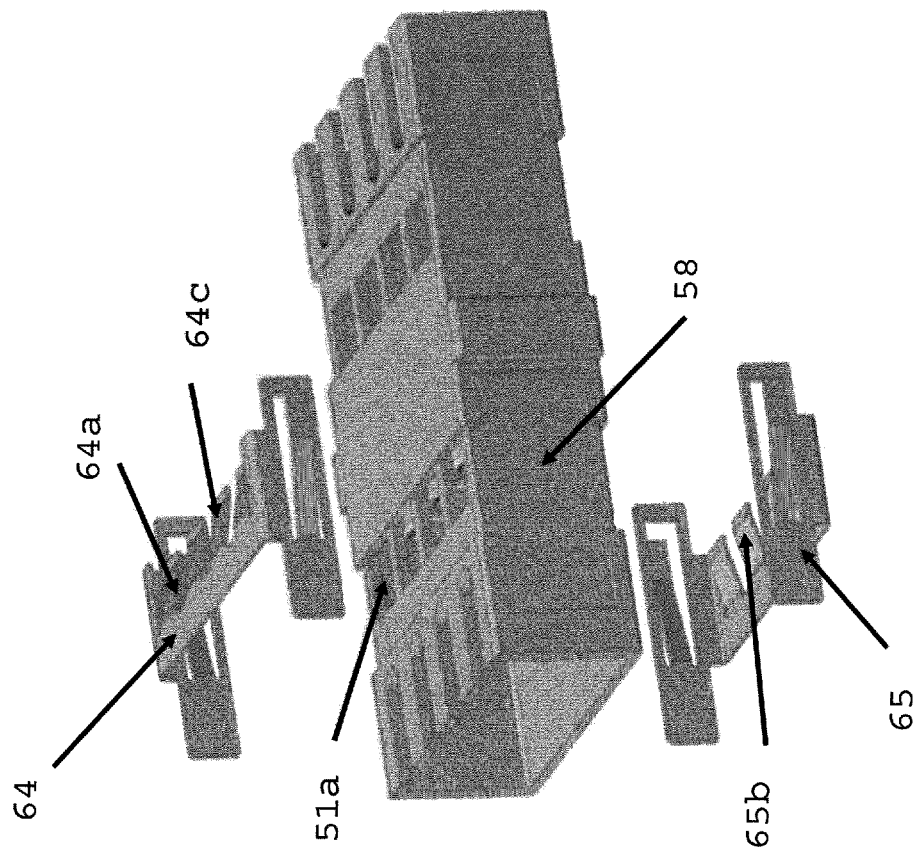
FIG. 6 is an exploded view of the adapter of FIG. 5.

FIG. 6 is an exploded view of an adapter housing (50) with the panel clips (64, 65). The adapter latch hooks (64a-64b) are inserted into a corresponding opening (51a-51d) when panel clip (64, 65) is inserted into recess 58. Upon insertion of connector (10), latch (64a) engages the metal plate (46a), and rests on the top face of its corresponding latch adapter surface (38a). The use of the metal latches and surfaces reduces the overall size of the adapter and connector because less plastic material is needed to reach the required stress and other related performance standards.

FIG. 7A is a perspective view of a mold metal insert (70) that is configured to be placed at proximal end of connector housing (10d) (refer to FIG. 7B). The insert may be made of plastic. The insert (70) has a top u-shaped cut-out (71a) and bottom u-shaped cut-out (71b) configured to accept a proximal end of pins (20a, 22a). Inert (70) further comprises two openings (70a, 70b) to accept ferrules (18a, 18b). FIG. 7B is a perspective view of the connector front (10d). Metal insert (70) is optional, and will eliminate wear from contact with the adapter latches (64, 65) on top of connector housing (36). Front body (10d) has a pair of opposing arms (40a, 40b) at a distal end. The arms further comprise a pin retainer and guide (39a, 39b) with an opening to accept either pin (20, 22). Arms (40a, 40b) cooperate with middle wall (73) to guide ferrule (18a, 18b) insertion into front body (10d) from a distal end of said body.

Figure 8A:
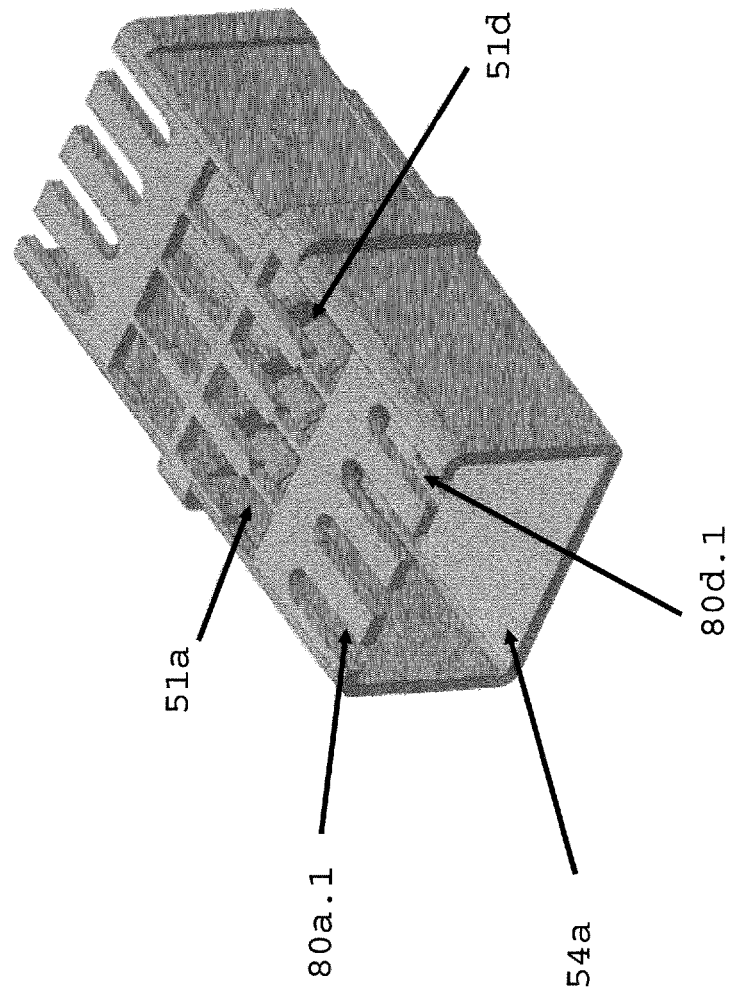
FIG. 8A is a perspective view of a prior art adapter.
Figure 8B:
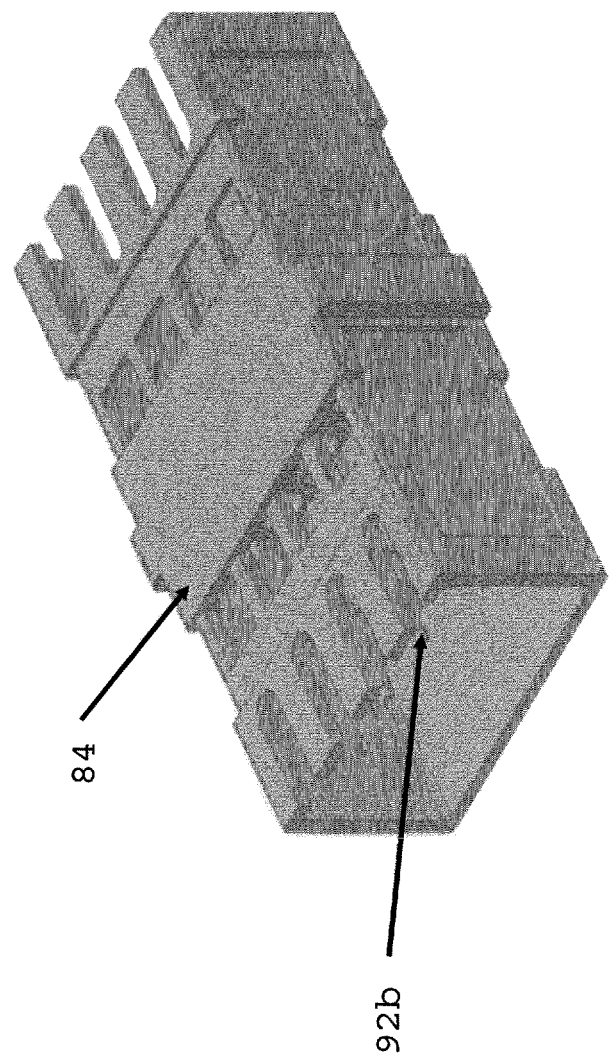
FIG. 8B is a perspective view of an adapter according to the present invention.

FIG. 8A is an adapter housing (80), with openings (51a-51d) configured to receive latch hooks (64a-64d) formed as part of a clip (64). Latch hooks (64a-64d) described above secure connector (10). Adapter (80) does not have internal ribs (see FIG. 8B, 9A) within adapter and the ribs form a channel as described below. Adapter has slots (80a.1-80d.1) for alignment key (30) on connector (10) where the key (30) indicates polarity. FIG. 8B is an adapter housing (82) with a top supporting surface (84) added to secure and stabilize the panel mounting clips (64, 65).

Figure 9A:
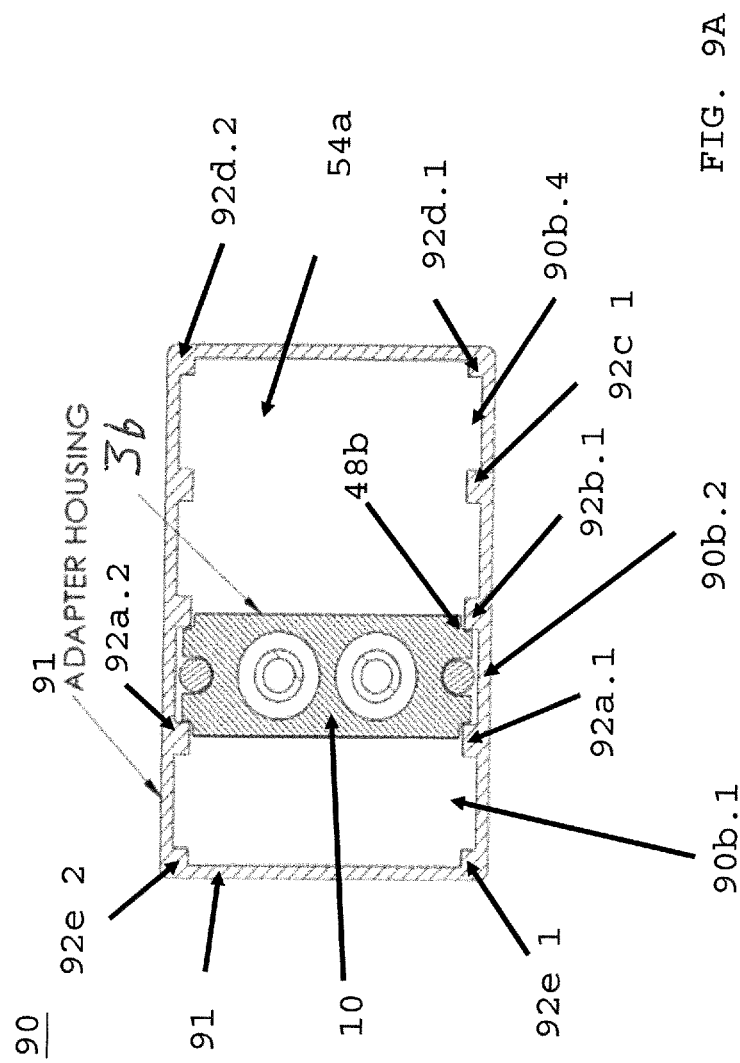
FIG. 9A is a cross section view of the adapter of FIG. 8B with the connector of FIG. 1 inserted therein.
Figure 9B:
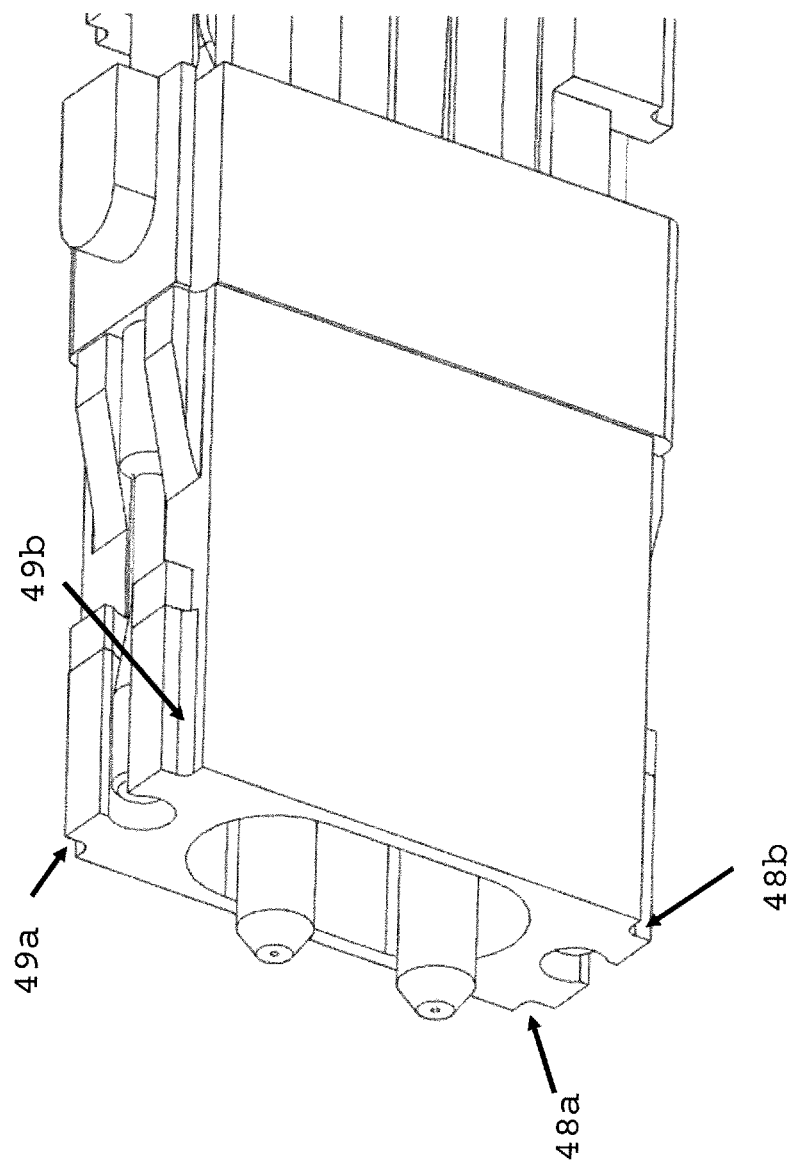
FIG. 9B is a perspective view of the proximal end of the connector housing of FIG. 1 illustrating notched corners.

FIG. 9A is perspective view of the connector (10) and its housing (36) illustrating notched corner (48b) configured to engage internal rib 92b.1. A rib (92a.1-92e.1; 92a.2-92e.2) is to align and support connector (10) upon insertion into a channel (90b.1, 90b.2) formed by a side-by-side rib pair (92a.1, 92b.1 and 92a.2, 92b.2) on an inside wall surface of receptacle or adapter opening (54a). Ribs are located along one inner side of adapter housing (91) and corresponding rib along an opposing wall of housing (91). FIG. 9B is a cross section of the adapter housing (50) with a connector (10) inserted. Referring to FIG. 9A and FIG. 9B, notched corners (48a, 48b or 49a, 49b) (refer to FIG. 9B), engage and accept their respective rib (92a.1, 92b.1; 92a.2, 92b.2) to reduce side loading and aid in location of the connector within the adapter housing (91). The rib pairs (92e.1,92a.1; 92e.2, 92a.2) form a channel (90b.1) within opening (54a) of adapter (90). The rib pairs (92a.1, 92b.1; 92a.2, 92b.2) form channel (90b.2). Other rib pairs form remaining channels (90*b*.3, 90*b*.4). The ribs reduce the overall size of the adapter thereby reducing the overall adapter foot print. This reduces space within a data center.

The embodiments were chosen and described in order to best explain the principles of the invention and its practical application, thereby enabling others skilled in the art to understand the invention for various embodiments and with various modifications that are suited to the particular use contemplated.

The invention claimed is:

1. A fiber optic connector with a pull release comprising:
one or more ferrules having one or more optical fibers therein;
the ferrule is contained with a housing,
the housing further comprises an inner front body,
the inner front body has a pair of opposing arms with a pin retainer configured to allow a pin to be moved forward and rearward;
a first pin is longer than a second pin, the first pin is configured to move the second pin when the first pin is slide longitudinally; and wherein a tapered section of each pin lifts an adapter latch, thereby releasing the connector from an adapter channel.

2. A pin for lifting an adapter latch comprising:
the pin comprises a longitudinal shaft;
a proximal end of the pin shaft has a tapered surface; and
the pin extends distally beyond a connector housing for user access to remove the connector from within an adapter channel, and wherein
the tapered surface of the pin lifts an adapter latch hook to release the connector form the adapter channel.

* * * * *